United States Patent
Lee

(10) Patent No.: US 9,056,543 B2
(45) Date of Patent: Jun. 16, 2015

(54) DOOR WEATHER STRIP FOR MOTOR VEHICLE

(71) Applicants: Hyundai Motor Company, Seoul (KR); Kia Motors Corporation, Seoul (KR)

(72) Inventor: Jong Hae Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/022,963

(22) Filed: Sep. 10, 2013

(65) Prior Publication Data

US 2014/0157680 A1  Jun. 12, 2014

(30) Foreign Application Priority Data

Dec. 6, 2012 (KR) .................. 10-2012-0141294

(51) Int. Cl.
E06B 7/22 (2006.01)
B60J 10/00 (2006.01)
B60J 10/08 (2006.01)

(52) U.S. Cl.
CPC ............ B60J 10/0042 (2013.01); B60J 10/006 (2013.01); B60J 10/085 (2013.01)

(58) Field of Classification Search
CPC ..... B60J 10/0042; B60J 10/006; B60J 10/085
USPC .................. 49/498.1, 489.1, 493.1, 475.1
See application file for complete search history.

(56) References Cited

U.S. PATENT DOCUMENTS

| | | | |
|---|---|---|---|
| 4,381,115 A * | 4/1983 | Ko ................................ | 49/498.1 |
| 4,928,431 A * | 5/1990 | Kuzuhara et al. ............ | 49/479.1 |
| 5,099,612 A * | 3/1992 | Hayashi et al. .............. | 49/479.1 |
| 5,446,998 A * | 9/1995 | Arima .......................... | 49/490.1 |
| 5,649,405 A * | 7/1997 | Morihara et al. ............ | 52/716.1 |
| 5,918,421 A * | 7/1999 | Nozaki ......................... | 49/492.1 |
| 6,357,182 B1* | 3/2002 | Nozaki ......................... | 49/498.1 |
| 6,499,257 B1* | 12/2002 | Tsuchida et al. ............. | 49/495.1 |
| 6,739,094 B1* | 5/2004 | Berry et al. .................. | 49/478.1 |
| 7,992,875 B2* | 8/2011 | Kubo et al. ................... | 277/630 |
| 2002/0129558 A1* | 9/2002 | Baba et al. .................... | 49/498.1 |
| 2004/0079032 A1* | 4/2004 | Russell et al. ............... | 49/498.1 |
| 2006/0137255 A1* | 6/2006 | Nozaki ......................... | 49/498.1 |
| 2007/0245635 A1* | 10/2007 | Deguchi et al. .............. | 49/498.1 |
| 2007/0251153 A1* | 11/2007 | Oba et al. ..................... | 49/498.1 |
| 2009/0000206 A1* | 1/2009 | Okajima et al. ............. | 49/493.1 |

FOREIGN PATENT DOCUMENTS

| | | |
|---|---|---|
| JP | 2010-047146 A | 3/2010 |
| JP | 4684815 B2 | 5/2011 |
| JP | 2012-011908 A | 1/2012 |
| KR | 10-2004-0041805 A | 5/2004 |
| KR | 10-2010-0079988 A | 7/2010 |

* cited by examiner

*Primary Examiner* — Jerry Redman
(74) *Attorney, Agent, or Firm* — McDermott Will & Emery LLP

(57) ABSTRACT

The door weather strip for a motor vehicle includes a base portion attached to a door panel, a sealing portion, and a lever. The sealing portion is disposed to integrally extend from the base portion to tightly contact a vehicle body panel and seal a gap between the door panel and the vehicle body panel when the door panel is closed. The lever is connected to the base portion and the sealing portion and configured to be hung at the vehicle body panel while the door panel is closing such that the sealing portion rotates on the vehicle body panel.

9 Claims, 4 Drawing Sheets

DOOR WEATHER STRIP FOR MOTOR VEHICLE

CROSS-REFERENCE TO RELATED APPLICATION

This application claims benefit of priority to Korean Patent Application No. 10-2012-0141294 filed in the Korean Intellectual Property Office on Dec. 6, 2012, the entire contents of which are incorporated herein by reference.

TECHNICAL FIELD

The present inventive concept relates to a door weather strip for a motor vehicle, and more particularly, to a door weather strip for a motor vehicle, that is rotated and elastically deformed on a vehicle body panel that matches a door of the motor vehicle, when the door is closed.

BACKGROUND

In general, a weather strip is made of an excellent elastic rubber material so as to perform a role of maintaining air-tightness.

The weather strip has been adapted to a motor vehicle as a body side weather strip mounted on a vehicle body panel of the motor vehicle, a door side weather strip (or referred to as a door weather strip) mounted to a door of the motor vehicle, and so on.

The door weather strip is mounted on a door panel along the entire circumference of the door so as to maintain air-tightness of a passenger compartment when the door is closed, and tightly contacts a sealing surface of the vehicle body panel that matches the door when the door is closed.

The door weather strip is formed so as to be overlapped with the vehicle body panel by a predetermined amount for improving the air-tightness performance when the door is closed.

As such, when the door is closed so that the door weather strip is overlapped with the vehicle body panel, the door weather strip is elastically deformed from the original shape thereof and then tightly contacts the sealing surface of the vehicle body panel by an elastic repulsive force against the shape deformation thereof, thereby appropriately maintaining air-tightness of the inside of the passenger compartment room even while the motor vehicle is driven.

FIG. 1 shows a cross-sectional view in which a door weather strip according to the conventional art is mounted to a door panel. The door weather strip 10 includes a base portion 12 fixedly attached to a door panel 20, and a sealing portion 14 formed to integrally extend from the base portion 12 so as to be able to be elastically deformed.

The sealing portion 14 is formed to have a larger width than a width of a gap between the door panel 20 and a vehicle body panel 30 when a door is closed, whereby the sealing portion 14 is pressurized by the vehicle body panel 30 and is elastically deformed so as to block and seal the gap.

When the door is closed, however, an end portion 14a of the sealing portion 14 contacts a sealing surface 32 of the vehicle body panel 30. In this state, as the closing motion of the door continuously progresses, an end surface of the sealing portion 14 including the end portion 14a is moved while being pressurized by and tightly contacting the sealing surface 32 of the vehicle body panel 30.

If the end surface of the sealing portion 14 tightly contacting the sealing surface 32 of the vehicle body panel 30 is moved along the sealing surface 32 of the vehicle body panel 30, the sealing portion 14 is quickly abraded by the repeated opening and closing process of the door so that air-tightness performance thereof is deteriorated. Furthermore, abnormal noise is generated when the sealing portion 14 of the door weather strip rubs the vehicle body panel 30, whereby the noise, vibration, and harshness (NVH) performance of the motor vehicle is deteriorated.

The above information disclosed in this Background section is only for enhancement of understanding of the background of the inventive concept and therefore it may contain information that does not form the prior art.

SUMMARY

The present inventive concept has been made in an effort to provide a door weather strip for a motor vehicle having advantages of improving its durability and preventing abnormal operative noise by reducing abrasion due to friction between the door weather strip and a vehicle body panel by rotating on the vehicle body panel matching a door panel when a door is closed.

An aspect of the present inventive concept relates to a door whether strip for a motor vehicle, including a base portion attached to a door panel, a sealing portion disposed to integrally extend from the base portion to tightly contact a vehicle body panel and seal a gap between the door panel and the vehicle body panel when the door panel is closed, and a lever connected to the base portion and the sealing portion and configured to be hung at the vehicle body panel while the door panel is closing such that the sealing portion rotates on the vehicle body panel.

The base portion may include an elastic deformation-inducing hollow hole penetrating the inside of the base portion.

The base portion may have a shape of a first tube with a cross-section of a rectangular shape having the elastic deformation-inducing hollow hole.

The sealing portion may have a circular arc shape extending from a first edge of the rectangular shape of the base portion.

The lever may extend from a second edge of the rectangular shape opposite of the first edge from which the sealing portion extends.

The lever may extend from the base portion more outside than the sealing portion.

The door whether strip may include a second tube having a closed hollow cross-section that is defined by the sealing portion, the lever, and the base portion.

The first tube and the second tube may share a partition wall.

The sealing portion may be connected to the base portion via a narrow portion with a thickness thinner than a thickness of the sealing portion or the base portion.

The sealing portion may include a foamed sponge rubber or a foamed rubber.

The lever may be include a harder material than a material of the sealing portion.

The lever may include a high hardness EPDM (ethylene propylene diene material).

The lever may include a solid rubber with a hardness higher than or equal to Hs hardness 90.

A door weather strip for a motor vehicle according to an aspect of the present inventive concept, rotates on a sealing surface of a vehicle body panel matching a door panel while the door is closed, so that the door weather strip is not excessively slidingly rubbed, whereby the door weather strip is not quickly excessively abraded.

Accordingly, the door weather strip is appropriately elastically deformed to firmly seal a gap between the door and the vehicle body panel even though the door is repeatedly opened and closed, thereby improving air-tightness performance thereof.

Furthermore, since early abrasion of the door weather strip is prevented, durability of the door weather strip can be improved and the span of service life thereof can be extended, and the NVH performance of a motor vehicle can be improved since abnormal noise due to excessive friction between the door weather strip and the vehicle body panel is prevented.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
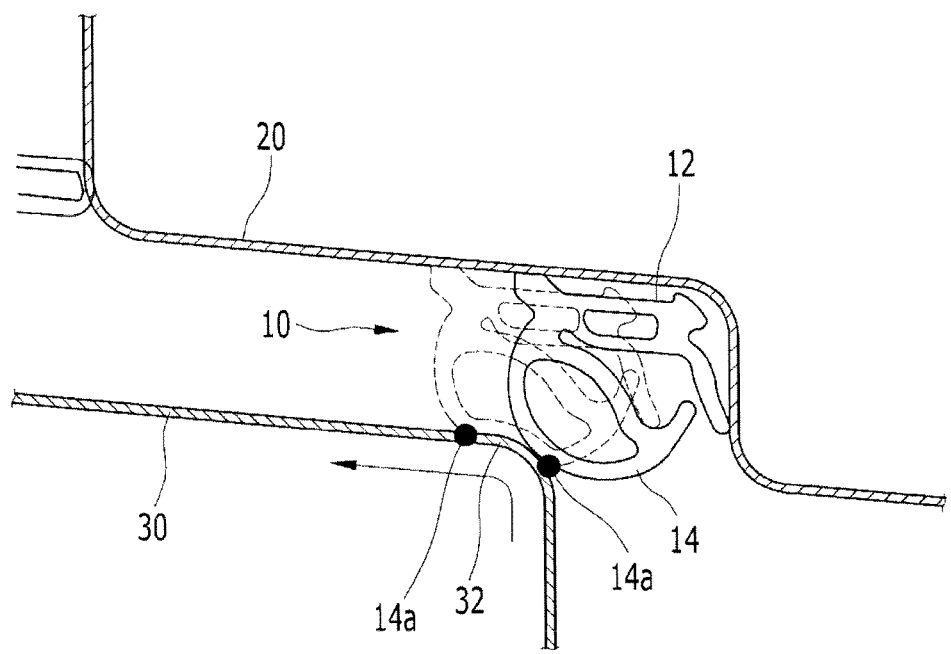
FIG. 1 is a cross-sectional view explaining deformation of a door weather strip mounted on a door panel according to the conventional art when a door is closed.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification.

Hereinafter, an exemplary embodiment of the present inventive concept will be described in detail with reference to the accompanying drawings.

Figure 2:
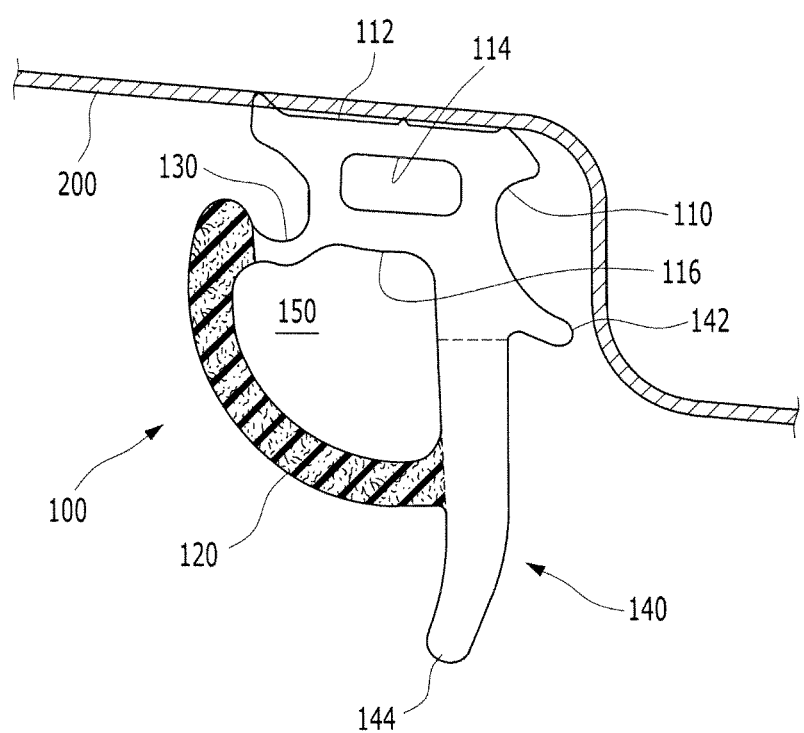
FIG. 2 is a cross-sectional view of a door weather strip mounted on a door panel according to an exemplary embodiment of the present inventive concept.

Referring to FIG. 2, a door weather strip 100 according to an exemplary embodiment of the present inventive concept may be integrally and fixedly attached to a door panel 200.

The door weather strip 100 may include a base portion 110 with a flat bottom surface 112 fixedly attached to the door panel 200.

The base portion 110 may have a cross-section of a substantially rectangular shape having the bottom surface 112. A deformation-inducing hollow hole 114 for inducing the base portion 110 to be readily elastically deformed may be formed in the cross-section of the rectangular shape.

Accordingly, the base portion 110 may form a first tube of a substantially rectangular shape having the deformation-inducing hollow hole 114.

A sealing portion 120 having a substantially circular arc shape may be formed to integrally extend from an edge of the base portion 110.

Between the sealing portion 120 and the base portion 110, a narrow portion 130 with a relatively thin thickness (e.g., relative to a thickness of the sealing portion 120 or base portion 110) may be formed for allowing elastic deformation of the sealing portion 120 to be readily performed.

That is, the sealing portion 120 may be connected to the base portion 110 via the narrow portion 130.

A lever 140 may be formed to integrally extend at an edge of the base portion 110 opposite of an edge of the base portion 110 at which the sealing portion 120 is formed along a width direction of the base portion 110.

The lever 140 may be integrally connected to the sealing portion 120 so that a closed hollow cross-section 150 is formed between the lever 140, the base portion 110, and the sealing portion 120.

Accordingly, a second tube having the closed hollow cross-section 150 surrounded by the lever 140, the base portion 110, and the sealing portion 120 may be formed.

The second tube and the first tube may be overlapped to share a partition wall 116.

A sealing lip 142 may be formed on an outside surface of the lever 140 to be protruded and extended outwards for improving air-tightness.

A tip end 144 may extend from the lever 140 in a longitudinal direction of the lever 140 so as to protrude more outside from the base portion 110 than the sealing portion 120.

The lever 140 may be formed of a material that is thicker and harder than the sealing portion 120.

For example, the sealing portion 120 may be made of a foamed sponge rubber, whereas the lever 140 can be made out of a foamed rubber or a solid rubber without adding a foaming agent.

The lever 140 may be made out of high hardness EPDM (ethylene propylene diene material) rubber (a double synthetic rubber).

Furthermore, the lever 140 may be formed by double extruding a high hardness solid rubber with a hardness higher than or equal to Hs hardness 90 to enhance strength thereof.

Figure 3:
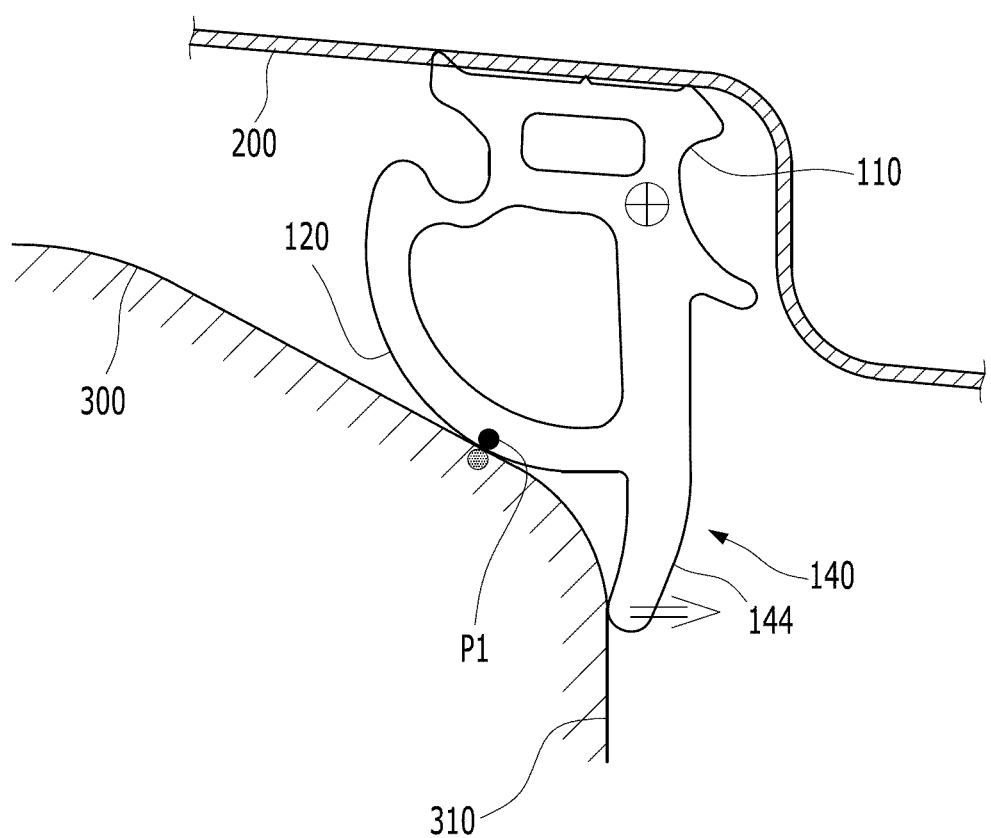
FIG. 3 is a cross-sectional view showing a state of a door weather strip according to an exemplary embodiment of the present inventive concept when a door panel with the door weather strip begins to close.

Referring to FIG. 3, in a state where the door weather strip 100 formed as described above according to an exemplary embodiment of the present inventive concept is attached to the door panel 200, while the door is closed, a partial portion of the circular arc-shaped exterior circumference of the sealing portion 120 may form a surface-contact P1 on a vehicle body panel 300, and the lever 140 may maintain a state of being hung at an end surface 310 of the vehicle body panel 300.

Figure 4:
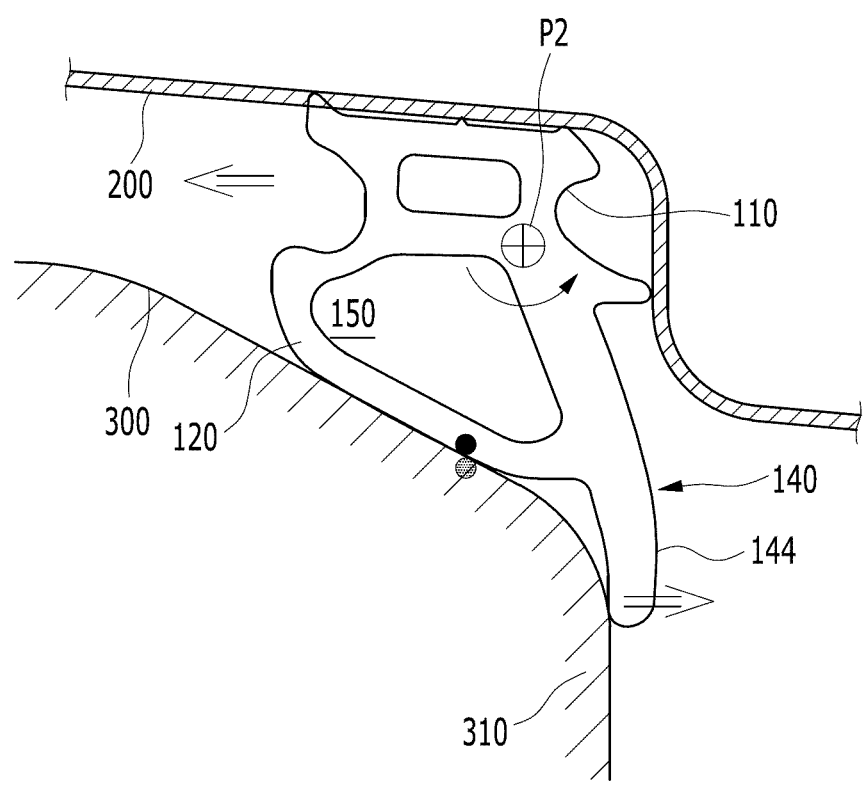
FIG. 4 is a cross-sectional view showing an operation of a door weather strip according to an exemplary embodiment of the present inventive concept while a door panel with the door weather strip is closed.

In this state, when the closing process of the door continues, while the door panel 200 continuously moves forward in a closing direction of the door, the lever 140 may maintain a state of being hung at the end surface 310 of the vehicle body panel 300, as shown in FIG. 4, and then the base portion 110 fixedly attached to the door panel 200 may move forward in the closing direction of the door together with the door panel 200.

That is, from the viewpoint of the door weather strip 100, a displacement difference between the base portion 110 and the lever 140 may be generated as the base portion 110 moves forward in a direction away from the lever 140 with the lever 140 being hung to the end surface of the vehicle body panel 300, whereby the sealing portion 120 may rotate counterclockwise around a rotating center P2 (see FIG. 4) which is located under the lever 140.

While the sealing portion 120 is rotated tightly contacting a sealing surface of the vehicle body panel 300 as described above, the sealing portion 120 may rotate on the sealing surface of the vehicle body panel 300 to tightly contact the vehicle body panel 300 in a state where the first surface-contact P1 for the sealing portion 120 to be surface-contacted with the vehicle body panel 300 is just maintained, whereby the sliding friction between the sealing portion 120 and the vehicle body panel 300 may be hardly generated or generated at a minimum level.

Therefore, in the process of closing the door, while there may be small concern of the door weather strip 100 slidingly rubbing against the vehicle body panel 300 to be worn down, there is no concern of the door weather strip 100 slidingly rubbing against the sealing surface of the vehicle body panel 300 to generate abnormal noise, and wear resistance. Thus, operability, and air-tightness of the door weather strip 100 are improved and the span of service life can be increased.

| <Description of Symbols> | |
|---|---|
| 100: door weather strip | 110: base portion |
| 120: sealing portion | 130: narrow portion |
| 140: lever | 200: door panel |
| 300: vehicle body panel | |

What is claimed is:

1. A door weather strip for a motor vehicle, comprising:
   a base portion attached to a door panel;
   a sealing portion disposed to integrally extend from the base portion to tightly contact a vehicle body panel and seal a gap between the door panel and the vehicle body panel when the door panel is closed; and
   a lever connected to the base portion and the sealing portion and configured to be hung at the vehicle body panel while the door panel is closing such that the sealing portion rotates on the vehicle body panel,
   wherein the base portion includes an elastic deformation-inducing hollow hole penetrating an inside of the base portion,
   the base portion has a shape of a first tube with a cross-section of a rectangular shape having the elastic deformation-inducing hollow hole,
   the sealing portion has a circular arc shape extending from a first edge of the rectangular shape of the base portion, and
   the lever extends from a second edge of the rectangular shape opposite of the first edge from which the sealing portion extends.

2. The door weather strip of claim 1, wherein the lever extends from the base portion more outside than the sealing portion.

3. The door weather strip of claim 2, further comprising a second tube having a closed hollow cross-section that is defined by the sealing portion, the lever, and the base portion.

4. The door weather strip of claim 3, wherein the first tube and second tube share a partition wall.

5. The door weather strip of claim 1, wherein
   the sealing portion is connected to the base portion via a narrow portion with a thickness thinner than a thickness of the sealing portion or the base portion.

6. The door weather strip of claim 1, wherein the sealing portion includes a foamed sponge rubber or a foamed rubber.

7. The door weather strip of claim 1, wherein the lever includes a material harder than a material of the sealing portion.

8. The door weather strip of claim 7, wherein the lever includes a high hardness EPDM (ethylene propylene diene material).

9. The door weather strip of claim 7, wherein the lever includes a solid rubber with a hardness higher than or equal to Hs hardness 90.

* * * * *